US012104872B1

(12) United States Patent
Bray

(10) Patent No.: US 12,104,872 B1
(45) Date of Patent: Oct. 1, 2024

(54) FIREARM RECEIVER

(71) Applicant: Polaris Capital Corporation, Orem, UT (US)

(72) Inventor: Ernest R. Bray, American Fork, UT (US)

(73) Assignee: Polaris Capital Corporation, Orem, UT (US)

( * ) Notice: Subject to any disclaimer, the term of this patent is extended or adjusted under 35 U.S.C. 154(b) by 0 days.

(21) Appl. No.: 18/639,730

(22) Filed: Apr. 18, 2024

Related U.S. Application Data

(60) Provisional application No. 63/624,093, filed on Jan. 23, 2024.

(51) Int. Cl.
*F41A 3/66* (2006.01)
*B33Y 80/00* (2015.01)

(52) U.S. Cl.
CPC ................. *F41A 3/66* (2013.01); *B33Y 80/00* (2014.12)

(58) Field of Classification Search
CPC ................................... F41A 3/66; F41C 23/16
See application file for complete search history.

(56) References Cited

U.S. PATENT DOCUMENTS

| | | | |
|---|---|---|---|
| 7,261,029 B1 | 8/2007 | Davis | |
| 8,276,502 B1 | 10/2012 | Wright | |
| 8,407,925 B2 | 4/2013 | Fesas | |
| 8,572,875 B2 | 11/2013 | Sisgold | |
| 9,482,480 B2 | 11/2016 | O'Dell | |
| 9,494,375 B2 | 11/2016 | Mikroulis | |
| 9,777,975 B2 | 10/2017 | Folkestad, II et al. | |
| 10,598,464 B2 | 3/2020 | Faifer | |
| 11,340,029 B2 * | 5/2022 | Stenzel | F41A 35/06 |
| 11,674,773 B2 | 6/2023 | Nedev | |
| 2012/0131838 A1 | 5/2012 | Edge et al. | |
| 2016/0298921 A1 | 10/2016 | Larson, Jr. et al. | |
| 2022/0018618 A1 | 1/2022 | Stenzel | |
| 2022/0364810 A1 | 11/2022 | Stenzel | |

* cited by examiner

*Primary Examiner* — Reginald S Tillman, Jr.
(74) *Attorney, Agent, or Firm* — Kunzler Bean & Adamson

(57) ABSTRACT

Apparatuses, systems, and methods are disclosed for use in or with firearms. A firearm receiver includes an elongated channel machined or 3D printed from a metallic material, and has a front end and a rear end. The firearm also includes a front trunnion having a rear portion coupled to the front end of the elongated channel and having a front portion configured to couple to a handguard. Also includes is a rear trunnion coupled to the rear end and configured to receive an accessory adapter.

20 Claims, 8 Drawing Sheets

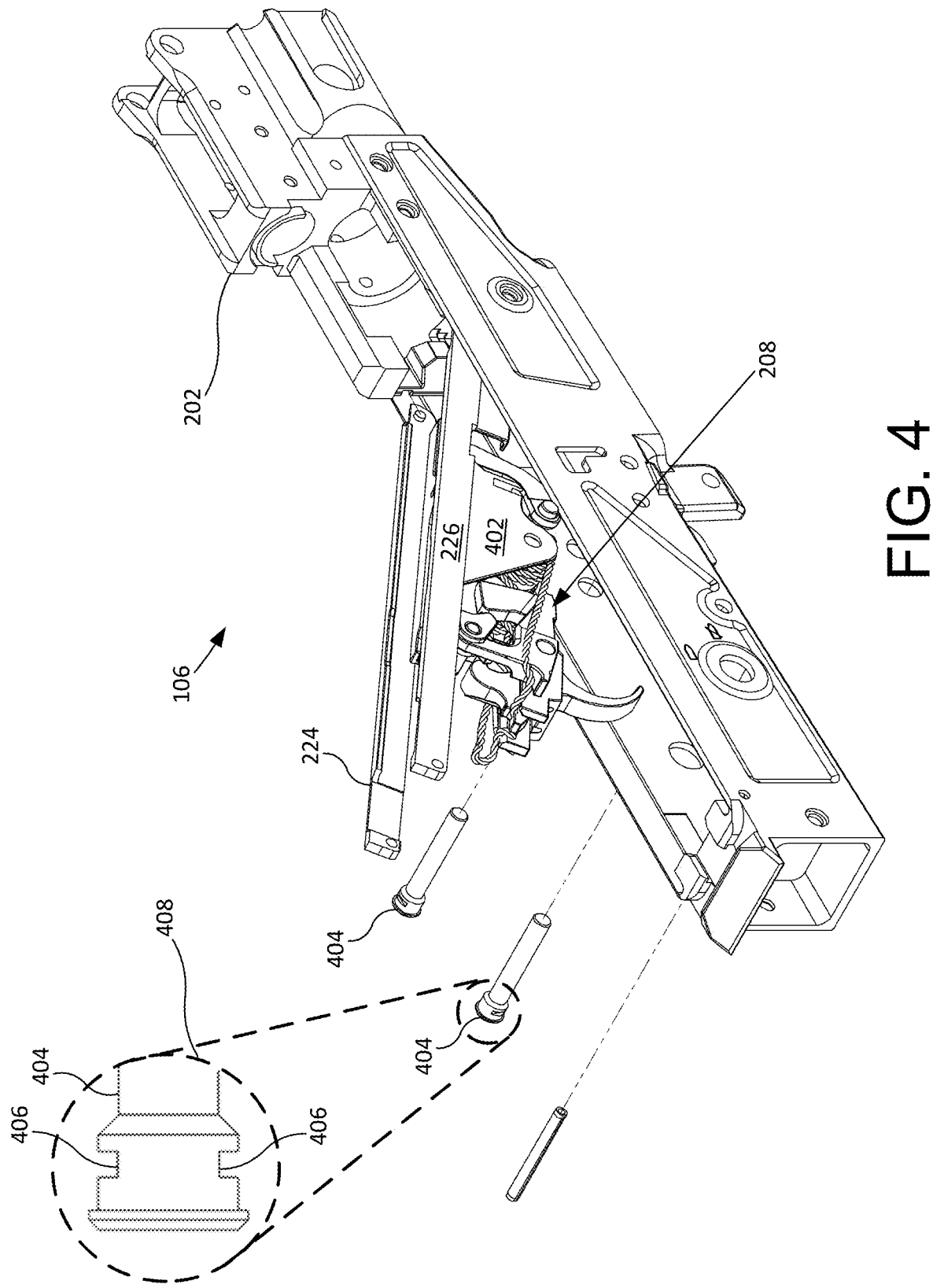

FIREARM RECEIVER

CROSS-REFERENCES TO RELATED APPLICATIONS

This application claims the benefit of U.S. Provisional Patent Application No. 63/624,093 entitled "FIREARM RECEIVER" and filed on Jan. 23, 2024, for Ernest R. Bray, which is incorporated herein by reference.

FIELD

This disclosure relates generally to firearms, and more particularly to receivers for modular firearm systems.

BACKGROUND

Designs for many AK-47 and AK-74 type rifles prioritize quick, low-cost production methods over accuracy. Traditionally, receivers for these firearms are manufactured using flat stamped and/or bent sheet steel with spot welded bolt carrier rails, and front and rear trunnions that are riveted in. Barrels are also frequently welded in. The issues with this kind of manufacturing process are numerous, with a major issue being that flex and stress cause cracking at the rivets and also cause issues for scope mounting. Spot welds break and serviceability is nearly impossible. Removing the rivets can damage and potentially destroy the receiver, which is problematic because the receiver is the serialized/registered component of the firearm.

CNC milled receivers have been introduced to overcome these issues. However, these milled receivers are frequently made of steel and are expensive and heavy. Traditional milled receivers also do not utilize or interface with barrel trunnions. Barrels, in this example, directly interface with and are directly held in the receiver by a threaded interface or rivets. These milled receivers frequently incorporate a rear sight block that attaches to the barrel. Additionally, common milled receivers do not include a removable trunnion. Also, the butt stock interface is milled into the receiver itself which eliminates modularity.

These and other construction methods of currently available AK-47 receivers also can cause misalignment between the receiver and the barrel from shot to shot. Also, contact between the barrel and other components may push the barrel in different directions (e.g., due to force on a handguard attached to the barred), or may interfere with barrel harmonics, so that the barrel vibrates or oscillates differently from shot to shot. Despite these accuracy problems, modern warfighters who need to fire accurately may want to use AK-47 type rifles for a variety of reasons, such as to utilize widely available interchangeable parts, or in circumstances when the distinctive sound of an AK-47 is expected.

SUMMARY

Apparatuses are disclosed for use in firearms. In certain examples, a firearm receiver includes an elongated channel machined or 3D printed from a metallic material, and has a front end and a rear end. The firearm also includes a front trunnion having a rear portion coupled to the front end of the elongated channel and having a front portion configured to couple to a handguard. Also includes is a rear trunnion coupled to the rear end and configured to receive an accessory adapter.

Various examples of firearms are disclosed. A firearm, in certain examples includes a barrel, and the receiver, the front trunnion, and the rear trunnion. Also disclosed is a method for providing the receiver, the front trunnion, and the rear trunnion.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 4 is a perspective view diagram illustrating one example of the receiver in accordance with examples of the subject disclosure;

DETAILED DESCRIPTION

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

Figure 1:
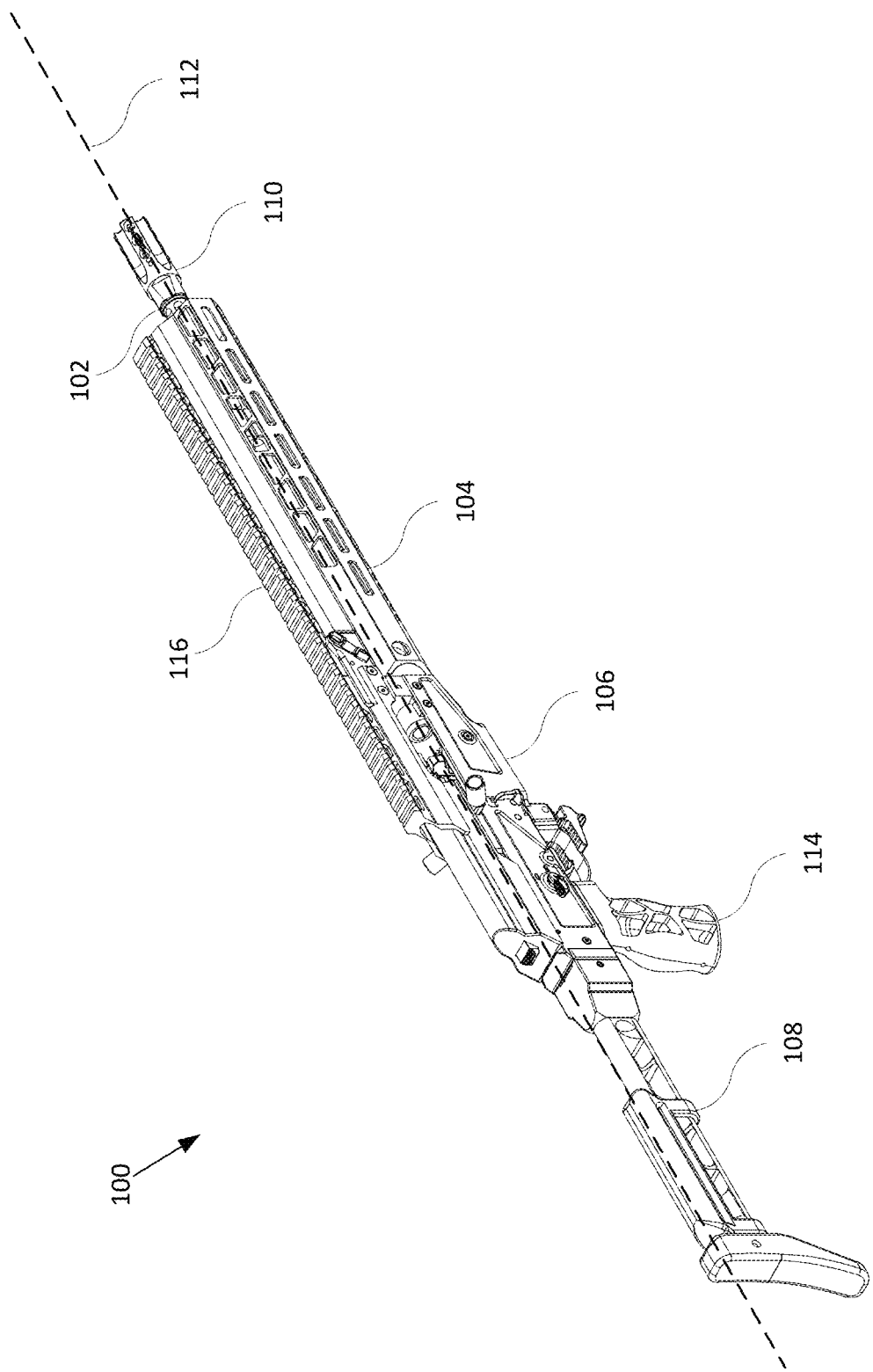
FIG. 1 is a perspective view diagram illustrating one example of a firearm, in accordance with examples of the subject disclosure.

FIG. 1 is a perspective view diagram illustrating one example of a firearm 100, in accordance with examples of the subject disclosure. The many examples disclosed herein address various issues with common firearms that have stamped or milled receivers. The depicted example illustrates a firearm 100 of the AK or Kalashnikov family of firearms. Terms such as "AK-47 type," "AK-47," "AK-type," "AK," "Kalashnikov rifle" and the like may be used herein to refer to rifles, and their components, based on the AK-47 designed by Mikhail Kalashnikov, including but not limited to the AK-47 itself, AKM, AK-74, AK-101, AK-102, AK-103, AK-104, AK-105, AK-12, and the like. A rifle with an AK-type receiver may be referred to using the above terms, regardless of whether the receiver itself originates with the Kalashnikov Concern or whether it is made by another manufacturer to be compatible with Kalashnikov components, and regardless of the origin of components other than the receiver. The AK variant depicted here is given by way of example only, and is not intended to be limiting; it is contemplated that the features of the current disclosure may be applicable to other types of firearms.

The firearm 100, in certain examples, include a barrel 102, a handguard 104 that surrounds a portion of the barrel 102, a receiver 106, and a stock 108. Various other components of the firearm 100 are depicted which will be described in further detail below. As used herein, the terms "forward" and "front" refer to ends of mechanisms or devices that are nearest the muzzle end 110 of the firearm 100. Similarly, "rear" or "rearward" corresponds to ends of mechanisms or devices that are furthest from the muzzle end 110 of the firearm 100 (i.e., towards the stock 108). Terms such as "top" and "bottom" may also be used and refer to component positions as if the firearm were held in a traditional orientation, for example with the accessory rail 116 located on "top" of or "above" the receiver 106 and the handguard 104. Also depicted is a bore axis 112 that is defined by the barrel 102.

As will be described in greater detail below, the receiver 106 may be machined or 3D-printed (i.e., additive manufacturing). The receiver 106 may be formed from aluminum or other lightweight rigid materials that are capable of withstanding the forces generated by operating the firearm 100. The receiver 106, in certain examples, incorporates removable front and rear trunnions (see FIG. 2). This beneficially allows for a lightweight firearm (e.g., rifle or pistol) without compromising strength and provides a high degree of modularity for butt stock attachments. The receiver 106 also houses components of the firearm 100 for loading, firing, and ejecting ammunition, such as a bolt, bolt carrier, hammer firing pin, trigger, and the like.

The stock 108, in certain examples, if a folding stock and attaches to the rear of the receiver 106 while the barrel 102 attaches to the front of the receiver 106. The handguard 104 surrounds at least a portion of the barrel 102 and allows an operator to aim and fire the firearm 100 while holding the pistol grip 114 below the receiver 106 with one hand and the handguard 104 with the other hand.

In some AK-47 type rifles, blocks of metal may be attached to the front and rear of the receiver 106 to attach and support the barrel 102 and the stock 108. Such blocks may be referred to, respectively, as front and rear trunnions. The front trunnion may also be referred to as a firearm barrel trunnion. When the term "trunnion" is used herein without a modifier such as "front" or "rear," it refers to the firearm barrel trunnion, not to the rear trunnion. The trunnions are not visible in FIG. 1, but will be described in greater detail below.

For accuracy, it may be desirable for the barrel 102 of a rifle to be "free-floating" so that to the extent reasonably possible, the barrel 102 does not contact other components forward of the receiver 106 or trunnion. For example, if a handguard is coupled directly to the barrel 102, as in the original AK-47 design, force from the operator's hand on the handguard may flex the barrel slightly, or interfere with the natural vibration of the barrel (referred to as barrel harmonics) when the rifle is fired. If the barrel flexes or vibrates differently from shot to shot, the accuracy of the rifle will be reduced.

However, some contact between the barrel and other components forward of the trunnion may be necessary to operate an AK-47-type firearm. For example, a gas block allows gases in the barrel 102 from firing a cartridge to expand into a gas tube above the barrel, pushing a gas piston backward in the tube. The gas piston pushes a bolt carrier back to extract the spent case, then moves forward as a recoil spring moves the bolt carrier forward to chamber the next round. (The gas block and gas tube are not visible in FIG. 1 due to being coupled to the portion of the barrel 102 that is surrounded by the handguard 104). Thus, a certain amount of reciprocating mass in the gas piston is coupled to the barrel 102 by the gas tube and gas block in any AK-47 type firearm, and it may not be possible for a barrel 102 to be fully "free-floating," free from interference from the gas piston. However, for an AK-47 type firearm, a barrel may nevertheless be referred to as "free-floating" if forces on the handguard during use of the firearm are not transferred to the barrel 102 forward of the trunnion.

Thus, in the depicted embodiment, the trunnion itself supports the handguard 104, without the handguard 104 contacting other components of the firearm 100. Because the handguard 104 does not contact other components of the firearm 100 such as the barrel 102 or the gas tube (where lower and upper handguards are respectively mounted in the original AK-47 design), forces on the handguard during use of the firearm 100 are not transferred to the barrel 102 directly, or indirectly via the gas block. Thus, the barrel 102 is free-floating in the sense that forces on the handguard during use of the firearm 100 are not transferred to the barrel 102 except via the trunnion, providing improved accuracy over AK-47 type rifles without a free-floating barrel.

Figure 2:
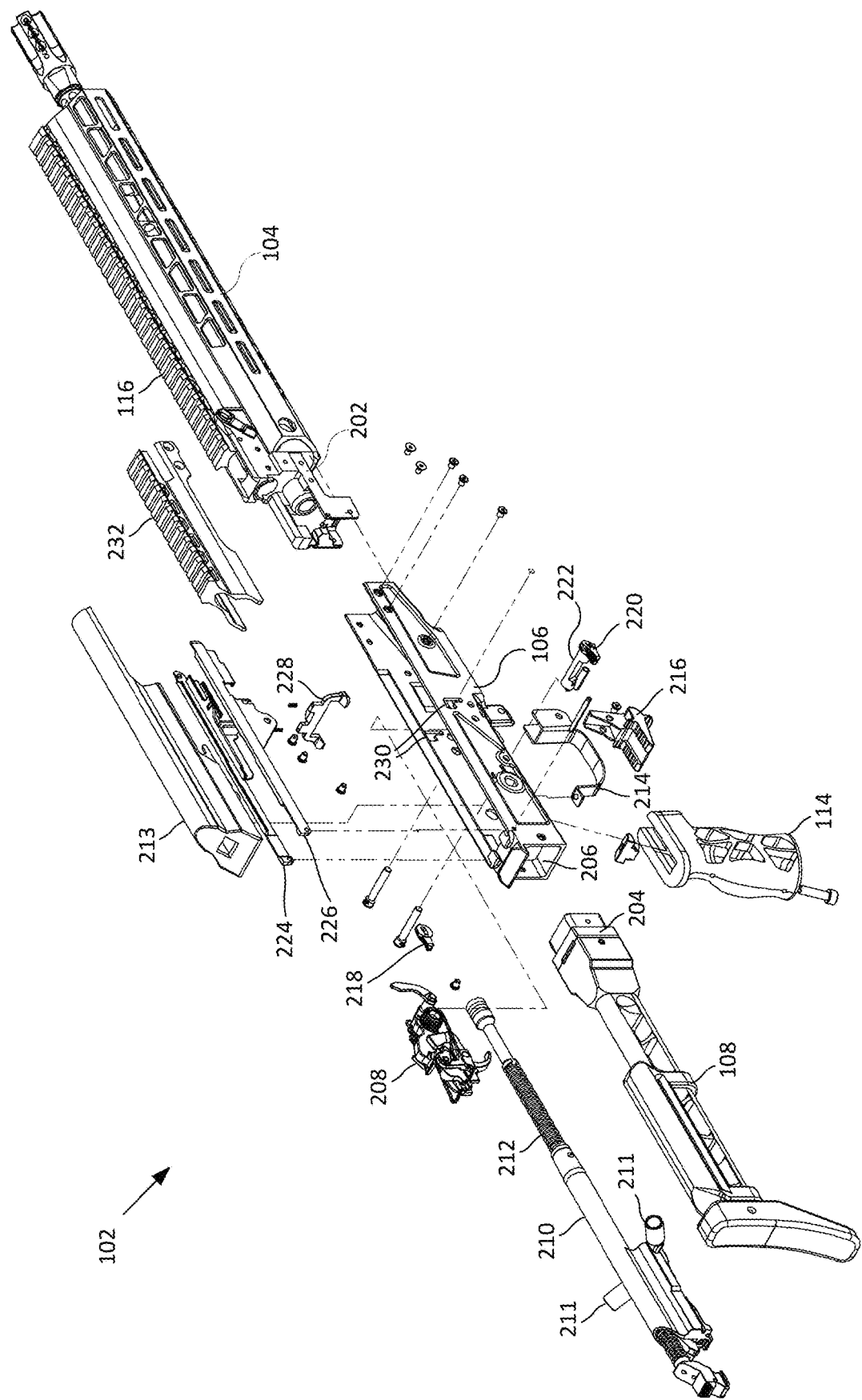
FIG. 2 is an exploded perspective view diagram illustrating one example of the firearm, in accordance with examples of the subject disclosure.

FIG. 2 is an exploded perspective view diagram illustrating one example of the firearm 100, in accordance with examples of the subject disclosure. The firearm 100, in certain examples, includes the receiver 106 which may be formed from a machined block of lightweight aluminum or other lightweight metal alloys that are capable of withstanding the forces and temperatures that are generated from firing the firearm 100. Similarly, the receiver 106 may be formed by additive manufacturing methods. Beneficially, the receiver 106 is configured to couple with a removable front trunnion 202 and a removable rear trunnion 204. The receiver 106 is formed having a generally elongated shape with sides extending upward to form a channel having a front end and a rear end. It is contemplated that different types of fasteners may be used to couple either the front trunnion 202 and/or the rear trunnion 204 to the receiver 106. Such fasteners include, but are not limited to rivets, screws, pins, etc.

In certain examples, the rear trunnion 204 is configured to insert into an opening 206 formed in a rear of the receiver 106. A shape of the opening 206 corresponds to and mates with a protrusion of the rear trunnion 204. The rear trunnion 204 is formed with a laterally symmetrical shape so that the rear trunnion 204 couples with the receiver 106 in different orientations. Beneficially, this allows for the folding stock 108 to be foldable to the right or to the left. In other words, the rear trunnion 204 may be coupled to the receiver 106 with a pivoting hinge oriented to pivot to the left or oriented to pivot to the right. In other examples, non-folding stocks are easily adapted to couple to the receiver 106 via an appropriate adapter coupled to the rear trunnion 204. The folding mechanism of the rear trunnion 204 will be described in greater detail below with respect to FIGS. 7A and 7B.

In certain examples, the receiver 106 is configured with a removable pistol grip 114. The receiver 106 may be formed with an interface surface on the bottom of the receiver that is configured to couple with AK-47 format pistol grips. In other examples, the receiver 106 is configured with an interface surface that couples with AR-15 format pistol grips. In yet other examples, an adapter (not shown) may be provided that allows for AR-15 format pistol grips to be coupled with a surface that is configured to couple to AK-47 style pistol grips.

Also depicted is a bolt carrier assembly 210. The bolt carrier assembly 210 may be configured with ambidextrous charging handles 211. The ambidextrous charging handles 211 extend through a slot formed between a dust cover 213 and the receiver 106. The charging handles 211 enable an operator to pull the bolt carrier assembly 210 into a spring-loaded, "ready and set" position before firing the firearm. The charging handles 211 may be positioned at approximately a 30 degree up-angle from horizontal for improved ergonomics.

In certain examples, a gas block allows gases in the barrel 102 from firing a cartridge to expand into a gas tube above the barrel 102, pushing a gas piston backward in the tube. The gas piston pushes the bolt carrier assembly 210 back to extract a spent case, then moves forward as a recoil spring 212 moves the bolt carrier assembly 210 forward to chamber the next round. (The gas block and gas tube are not visible in FIG. 2). Thus, a certain amount of reciprocating mass in the gas piston is coupled to the barrel 102 by the gas tube and gas block in any AK-47 type firearm, and it may not be possible for a barrel 102 to be fully "free-floating," free from interference from the gas piston. However, for an AK-47 type firearm, a barrel 102 may nevertheless be referred to as "free-floating" if forces on the handguard 104 during use of the firearm 100 are not transferred to the barrel 102 forward of the front trunnion 202.

In certain examples, the receiver 106 is configured to house the trigger and hammer assembly 208. The trigger and hammer assembly 208 is secured to the receiver with a fastener, as depicted. The fastener may be a pin, rivet, or threaded rod (i.e., screw or bolt). The trigger and hammer assembly 208 is positioned in the bottom of the receiver 106 so that the trigger extends downward from a bottom surface of the receiver 106 and allows an operator to pull the trigger to activate the hammer to fire the firearm 100.

The receiver 106, in certain examples, is configured with surface features adapted to couple with a removable trigger guard 214. The removable trigger guard 214 may be formed of any rigid material that is capable of resisting an impact that might otherwise damage or activate the trigger. The removable trigger guard 214 is fastened with the receiver 106 via any suitable fastener. In certain examples, a magazine release 216 is pivotally coupled with the removable trigger guard 214. The magazine release 216 beneficially is ambidextrous and configured to be activated by an operator on either the left side or the right side of the removable trigger guard 214. As depicted, the magazine release 216 is formed with wing portions or protrusions that extend rearward (i.e., towards the stock 108). Conventional magazine release mechanisms are activated by the operator reaching forward to the front of the trigger guard, which may be an awkward movement for many operators, and pushing the magazine release forward. Beneficially, an operator can activate the magazine release 216 of the subject disclosure by pushing downward on either of the wing portions or protrusions. Additionally, the magazine release 216 can still be activated in the same manner as a conventional magazine release, if so desired, by pushing forward on a bottom of the magazine release. A torsion spring (not depicted) may be disposed around the fastener of the magazine release 216 and biased to maintain the magazine release 216 in a position that secures a magazine.

In certain examples, the receiver 106 is configured with an ambidextrous safety selector. The ambidextrous safety selector, in the depicted example, is formed of various components that include a left-side safety selector 218, a right-side safety selector 220, and a safety selector barrel 222. The safety selector barrel 222 connects the left-side safety selector 218 with the right-side safety selector 220 to allow an operator to place the firearm into a mode that prevents the trigger from being pulled and firing the firearm. The safety selector beneficially is positioned in a position similar to that of an AR-style firearm and enables single-handed, left-handed, or right-handed operation without modifying the operator's grip. Additionally, the safety selector of the depicted example is configured to work with standard AK-style trigger and hammer assemblies 208. In certain examples, the left-side safety selector 218 and/or the right-side safety selector 220 may be replaced with different sized and shaped levers.

The receiver 106, in certain examples, is configured to couple with a left-side rail 224 and a right-side rail 226 (referred to jointly as "rails 224, 226"). The left-side rail 224 and right-side rail 226 may be formed of a highly wear-resistant material such as steel (or other suitable material). Additionally, the rails 224, 226 may be removable for maintenance or replacement if the rails 224, 226 wear to a point that they are no longer usable. The rails 224, 226 are configured to support the bolt carrier assembly 210 as it moves back and forth during operation of the firearm 100. Beneficially, having rails 224, 226 that are separate and removable from the receiver 106 allow the rails 224, 226 to be formed of a wear-resistant material, while the receiver 106 is formed of a lighter-weight metal or metal alloy. Another benefit of a receiver 106 configured to receive removable rails 224, 226 is the ability to receive rails that accommodate different bolt carriers.

Figure 5A:
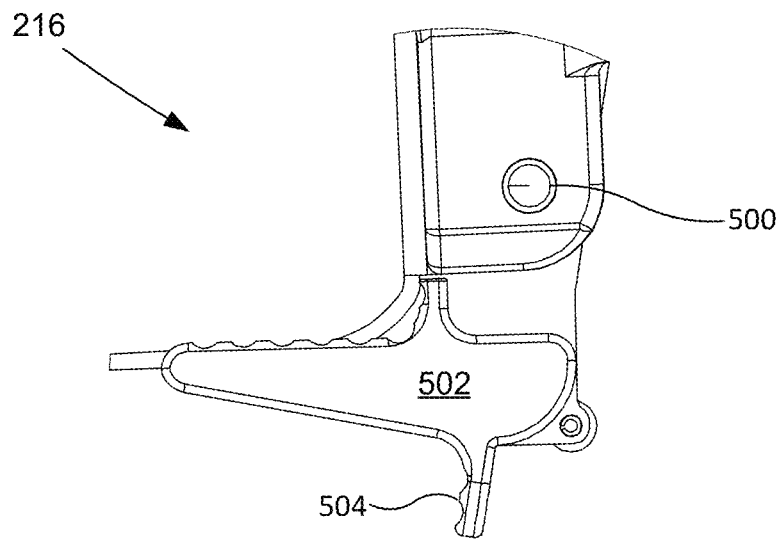
FIG. 5A is a side view diagram illustrating one example of the ambidextrous magazine release, in accordance with examples of the subject disclosure.

In certain examples, the receiver 106 is configured to receive an ambidextrous bolt catch 228. The ambidextrous bolt catch 228, as will be described in greater detail below with reference to FIG. 5A, is integrated with the rails 224, 226 and travels up and down substantially vertically in slots formed in the rails 224, 226. Finger pads of the ambidextrous bolt catch 228 extend through bolt catch slots 230 that are formed in sides of the receiver 106. Beneficially, the ambidextrous bolt catch 228 is configured to hold open the bolt carrier assembly 210 after the last round of the magazine is fired.

In certain examples, an additional accessory rail 232 is provided and adapted to rigidly couple to the front trunnion 202. The additional accessory rail 232 may be aligned with the main accessory rail 116 that is integrally formed with the handguard 104. The additional accessory rail 232 may be formed with the same configuration as the main accessory rail 116. In other words, both rails 116, 232 may be Weaver rails or Picatinny rails, or a mixture of both. Other options include, but are not limited to, STANG, RDS specific, or MOS type with plates for RDS. Beneficially, the additional accessory rail 232 is removable, which in turn allows for removal of the dust cover 213. Another benefit is that the additional accessory rail 232 is rigidly coupled with the front trunnion 202, instead of the top or dust cover 213, therefore the additional accessory rail 232 is not subject to excessive vibration and movement, which affects accuracy and potentially damages scopes.

Figure 3A:
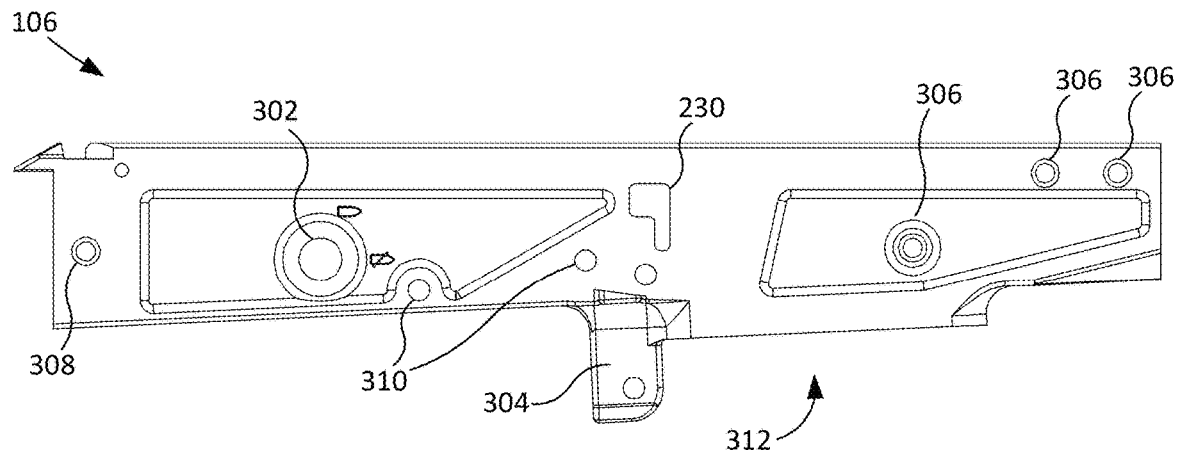
FIG. 3A is a side view diagram of the receiver, in accordance with examples of the subject disclosure.
Figure 3B:
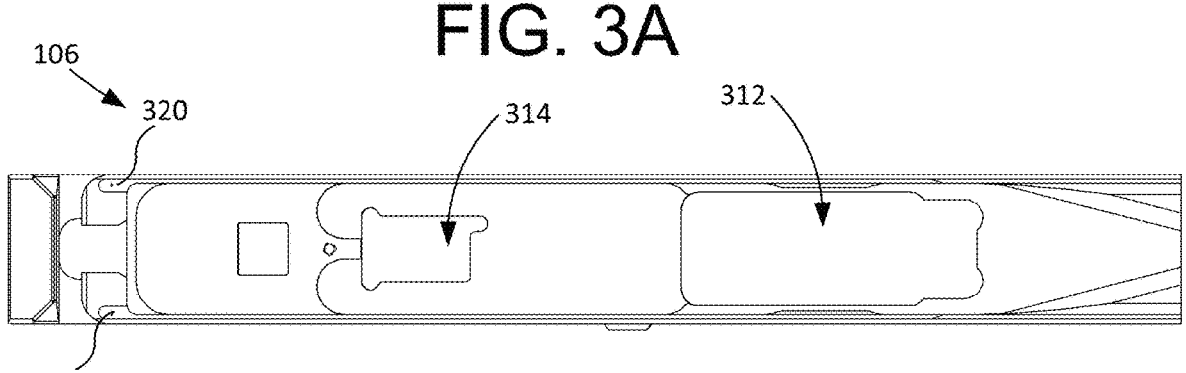
FIG. 3B is top view diagram of the receiver, in accordance with examples of the subject disclosure.
Figure 3C:
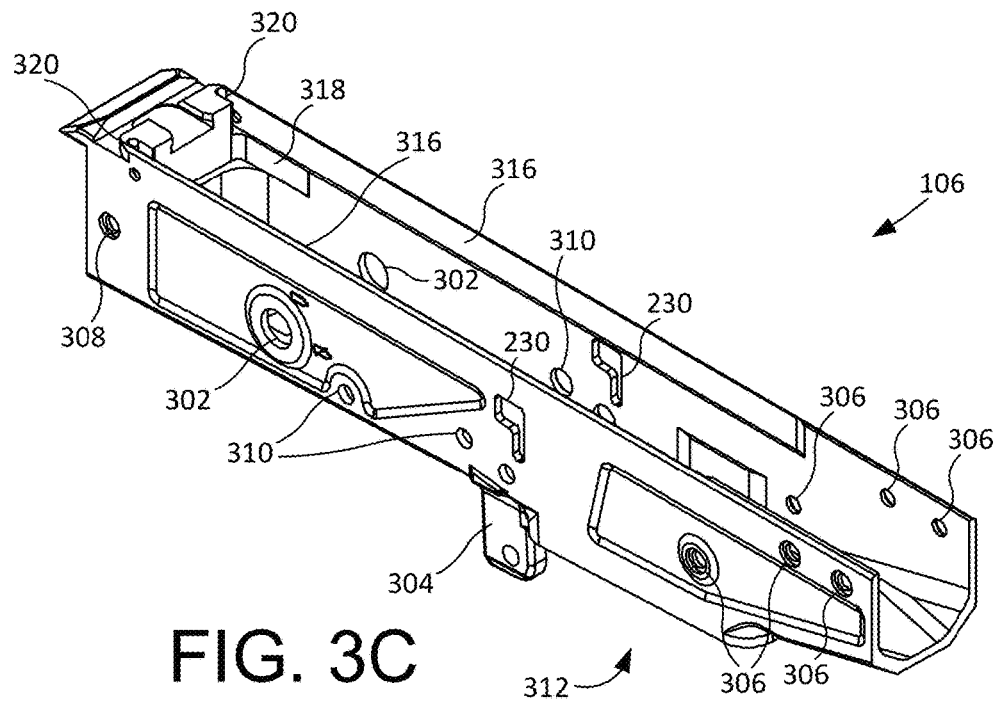
FIG. 3C is a perspective view diagram of the receiver, in accordance with examples of the subject disclosure.

FIGS. 3A, 3B, and 3C are side, top, and perspective view diagrams, respectively, of the receiver 106, in accordance with examples of the subject disclosure. As described above, the receiver 106 may be machined or 3D printed from a lightweight rigid material Examples of a lightweight rigid material include, but are not limited to, aluminum, aluminum alloys, or other metals or metallic alloys. In certain examples, the receiver 106 is configured to attach to the front trunnion 202 or the rear trunnion 204 via screws, bolts, pins, or other fasteners. In other examples, the rear trunnion 204 may be coupled to the receiver 106 via a quick release mechanism.

The receiver 106, in certain examples, is configured with an opening 302 on each side of the receiver 106 for the safety selector mechanism described above. The receiver 106 may be engraved/machined with icons for indicating a currently selected firing mode. Extending downward from the receiver 106 is an arm 304 for coupling the receiver 106 to the removable trigger guard 214 and the magazine release 216. An opening in the arm 304 allows for a fastener, such as a pin, screw, etc., to couple the removable trigger guard 214 and the magazine release 216 with the receiver 106.

In certain examples, the receiver 106 is configured with one or more pairs of front trunnion attachment points 306 for coupling the receiver 106 with the front trunnion 204. One example of a front trunnion capable of coupling with the receiver 106 is that front trunnion described in U.S. Pat. No. 11,248,871, which is incorporated herein by reference.

The receiver 106 also includes, in certain examples, a rear accessory attachment point 308 for securing an accessory, such as a stock, to the rear of the receiver 106. Additional openings 310 are provided on each side of the receiver 106 for securing the trigger and hammer assembly 208 within the receiver 106. Other openings are contemplated for convenience with maintenance and/or accommodating other components.

In certain examples the receiver 106 includes a magazine well 312. The magazine well 312 is an area of the receiver 106 adapted for receiving a magazine that holds ammunition. In certain examples, the bottom of the magazine well 312 is flared open to aide in the insertion of magazines. Stated differently, the bottom opening dimensions of that magazine 312 are greater than the opening dimensions at the top of the magazine well 312. In other words, the bottom opening depicted in FIG. 3C is greater in size than the top opening of the magazine well 312 depicted in FIG. 3B. In certain examples, the receiver 106 also includes an opening 314 in the receiver to allow the trigger to pass from an interior area of the receiver 106 to an exterior area of the receiver 106.

The receiver 106, in certain examples, includes a pair of longitudinally extending grooves 316 for receiving the left-side rail 224 and the right-side rail 226. The grooves 316 for the rails 224, 226 are positioned adjacent a top edge of the sides of the receiver 106 and extend substantially along an entire length of the side of the receiver 106. Additional grooves 318 may be positioned below the grooves 316 to accommodate the rails 224, 226. In certain examples, the receiver 106 is configured with notches 320 disposed adjacent the rear of the receiver 106 to receive the rails 224, 226. The notches 320 locate and maintain the position of the rails 224, 226 with respect to the receiver 106.

FIG. 4 is a perspective view diagram illustrating one example of the receiver 106 in accordance with examples of the subject disclosure. In the depicted example, the receiver 106 is shown in a partially assembled state, with the front trunnion 202 positioned at the front of the receiver 106, and the trigger and hammer assembly 208 is shown being inserted into the receiver 106 with the left-side rail 224 and the right-side rail 226. The rails 224, 226 may be formed with downwardly projecting members 402 for coupling the trigger and hammer assembly 208 with the rails 224, 226. Various fasteners, as depicted here and in FIG. 2 are used to couple the various components together and to the receiver 106.

Although rivets may be used as fasteners, the receiver 106 of the present disclosure may be adapted to use various reusable fasteners, such as pins, screws, bolts, etc. This beneficially allows for a removable front trunnion 202 that improves the ability to repair and replace components. It is contemplated that in this example, the front trunnion 202 may be the serialized and/or registered part of the firearm, thereby allowing different receiver options to be installed with the front trunnion 202.

In certain examples, the receiver uses anti-rotation pins 404 to prevent excessive wear that is common with trigger and hammer pins of prior machined receivers. Each trigger and hammer pin, or anti-rotation pin 404, may be formed with anti-rotation flats 406 in the head of the pin 404, as depicted in the callout bubble 408, instead of grooves as used previously. The flats 406 engage the retainer plate (see FIG. 5B) and prevents rotation.

FIG. 5A is a side view diagram illustrating one example of the ambidextrous magazine release 216, in accordance with examples of the subject disclosure. The magazine release 216, as described above, is pivotally coupled, via a pivot point 500, with the removable trigger guard 214. The magazine release 216 beneficially is ambidextrous and configured to be activated by an operator on either the left side or the right side of the removable trigger guard 214. As depicted, the magazine release 216 is formed with wing portions 502 or protrusions that extend rearward (i.e., towards the stock 108). Conventional magazine release mechanisms are activated by the operator reaching forward to the front of the trigger guard, which may be an awkward movement for many operators, and pushing the magazine release forward. Beneficially, an operator can activate the magazine release 216 of the subject disclosure by pushing downward on either of the wing portions 502 or protrusions. Additionally, the magazine release 216 can still be activated in the same manner as a conventional magazine release, if so desired, by pushing forward on a bottom 504 of the magazine release. A torsion spring (not depicted) may be disposed around the fastener of the magazine release 216 and biased to maintain the magazine release 216 in a position that secures a magazine.

Figure 5B:
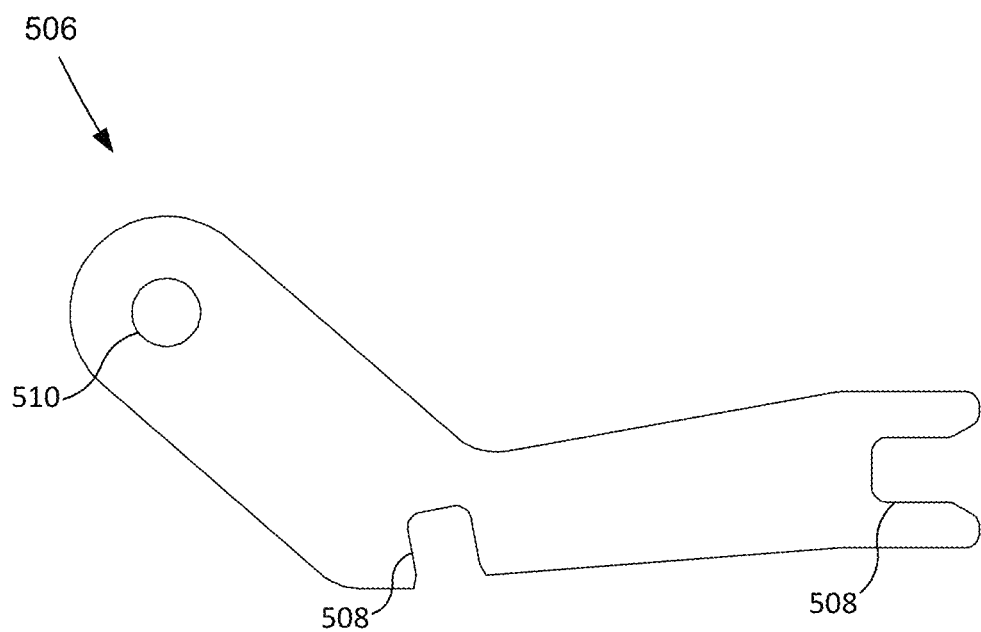
FIG. 5B is a side view diagram illustrating one example of a retainer plate, in accordance with examples of the subject disclosure.

FIG. 5B is a side view diagram illustrating one example of a retainer plate 506, in accordance with examples of the subject disclosure. The retainer plate 506, as described above, engages the flats 406 of the anti-rotation pins 404 to prevent rotation of the pins 404. The retainer plate 506 includes a pair of notches 508 that are shaped to engage the flats 406 of the pins 404. It is contemplated that other configurations of a retainer plate 506 may function to prevent the pins 404 from rotating. The retainer plate 506 also includes a pin opening 510 for fastening the retainer plate 506 to the receiver 106.

Figure 6A:
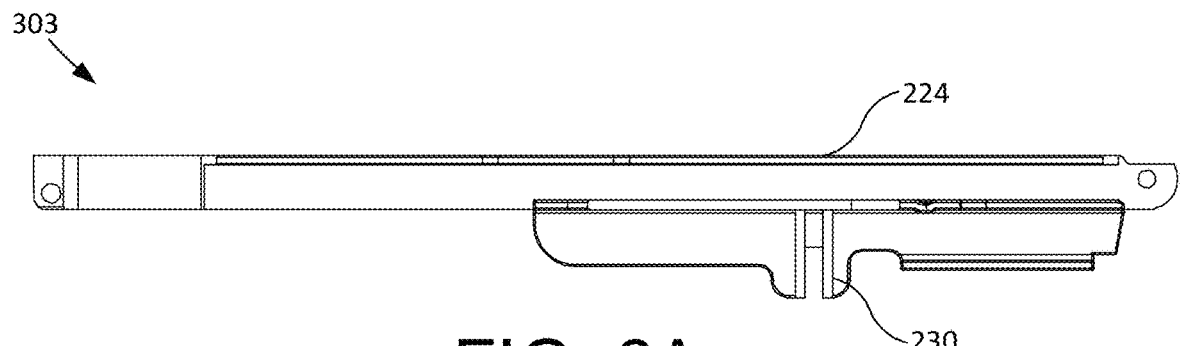
FIG. 6A is a side view diagram of the left-side rail according to examples of the subject disclosure.
Figure 6B:
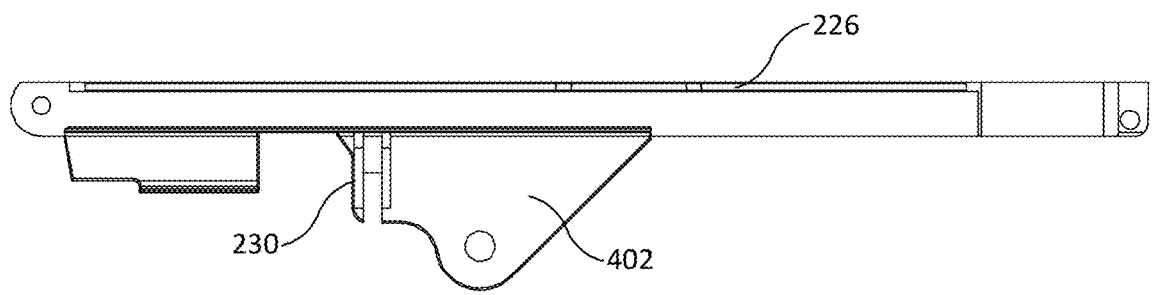
FIG. 6B is a side view diagram of the right-side rail according to examples of the subject disclosure.
Figure 6C:
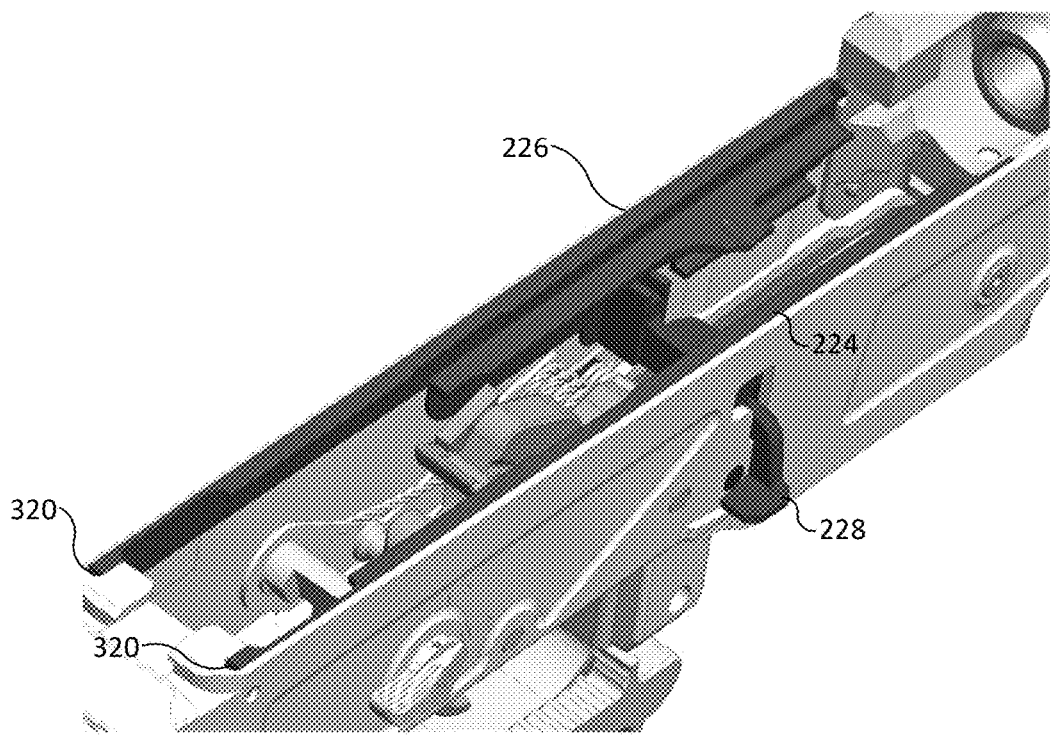
FIG. 6C is a perspective view diagram of the rails, in accordance with examples of the subject disclosure.

FIGS. 6A, 6B, and 6C illustrate examples of the left-side rail 224 and the right-side rail 226, according to examples of the subject disclosure, and are described here jointly. FIGS. 6A and 6B depict the interior surfaces of the rails 224, 226, or in other words, the surfaces that face each other. Each of the rails 224, 226 is configured with a substantially vertical bolt catch slot 230. The bolt catch slot 230 allows the ambidextrous bolt catch 228 to move between a position that allows the bolt carrier assembly 210 to move forward and backward during operation, and a position that maintains the bolt carrier assembly 210 in an open position. The open position is useful for indicating when the magazine is empty and needs to be replaced. In certain examples, the right-side rail 226 is configured with the downwardly projection member 402 that connects with, via a fastener or pin, the trigger and hammer assembly 208.

Figure 7A:
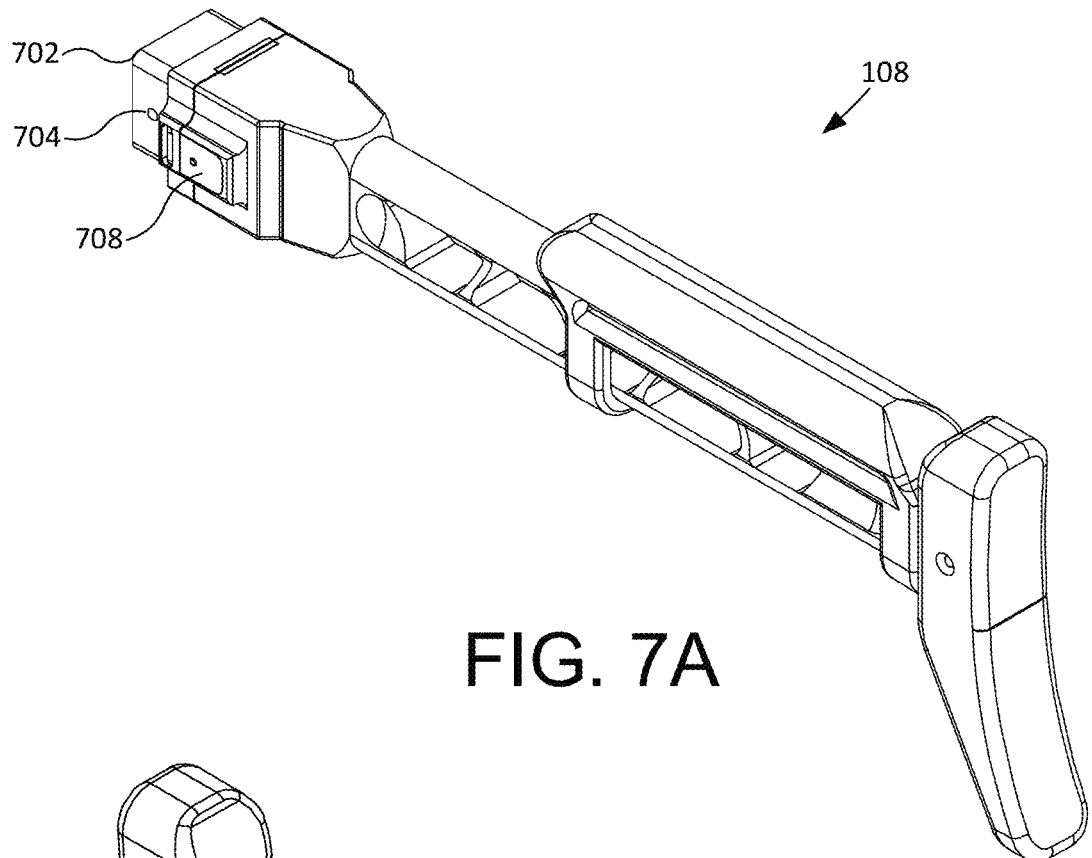
FIG. 7A is perspective view diagram of the stock, in accordance with examples of the subject disclosure.
Figure 7B:
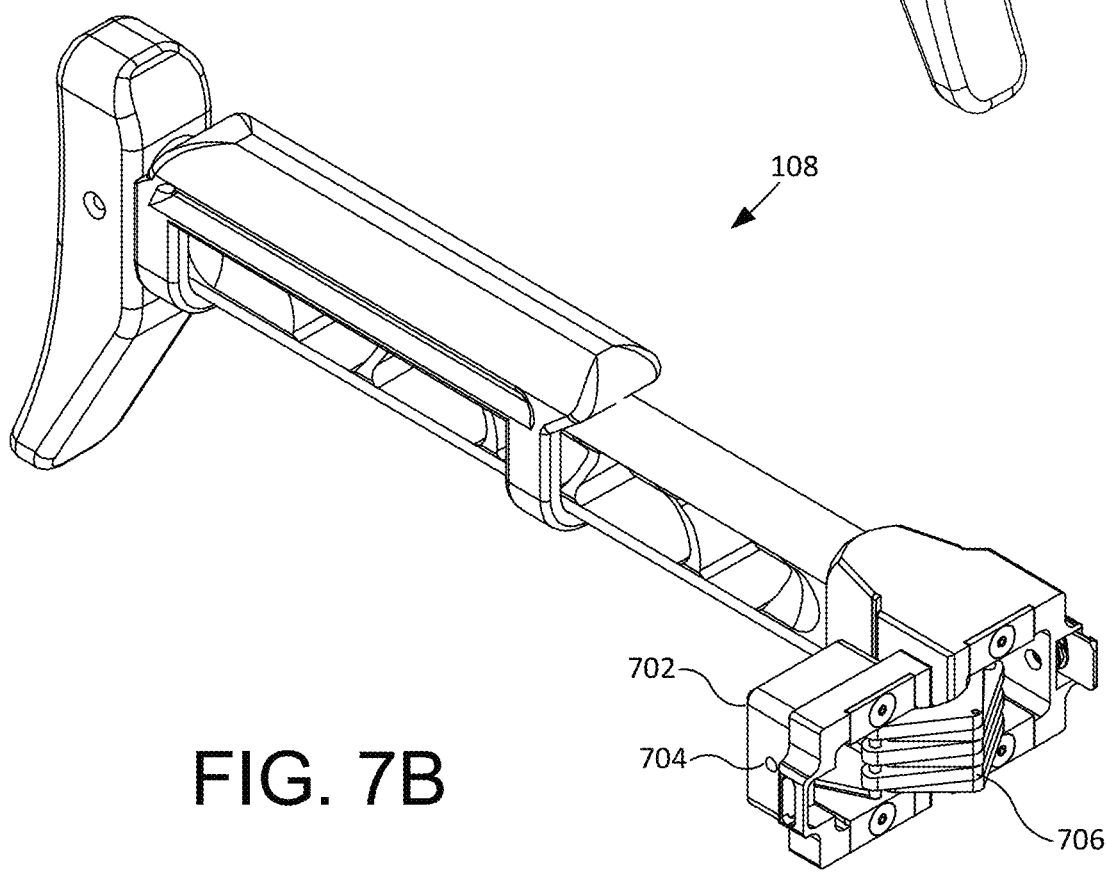
FIG. 7B is a perspective view diagram of another example of the stock, in accordance with examples of the subject disclosure.

FIGS. 7A and 7B are perspective view diagrams of the stock 108, in accordance with examples of the subject disclosure. In certain examples, the rear trunnion 202 is configured to accept various different adapter modules. Examples of different modules that may be coupled to the receiver 106 via the rear trunnion 202, include but are not limited to, Picatinny attachments, AR-type buffer tube attachments, traditional wood stocks, etc. In the examples depicted in FIGS. 7A and 7B, a quick-disconnect folding stock 108 is shown with an adapter 702 that is configured to insert into the rear trunnion 202 of the receiver 106.

In certain examples, the adapter 702 is configured with a shape that corresponds with the opening formed by the rear trunnion 202. The adapter 702, in certain examples, is secured to the rear trunnion 202 via a fastener through an opening 704 that aligns with a corresponding opening in the receiver 106. The stock 108 may include a concealed hinge 706 and a quick disconnect latch 708. The concealed hinge 706 is configured to allow the stock 108 to fold from an extended position to a folded position that is adjacent to the receiver 106. Beneficially, the stock 108 is adaptable to fold to either the left side or the right side of the receiver 106. Additionally, the hinge 706 does not add unnecessary length, weight or complexity as exiting art dual fold mechanisms with exposed hinges do. The hinge 706 also conceals the fact that the firearm 100 has a folding stock. The hinge 706 eliminates the external hinges which can snag on gear and become damaged from hard use.

Figure 8:
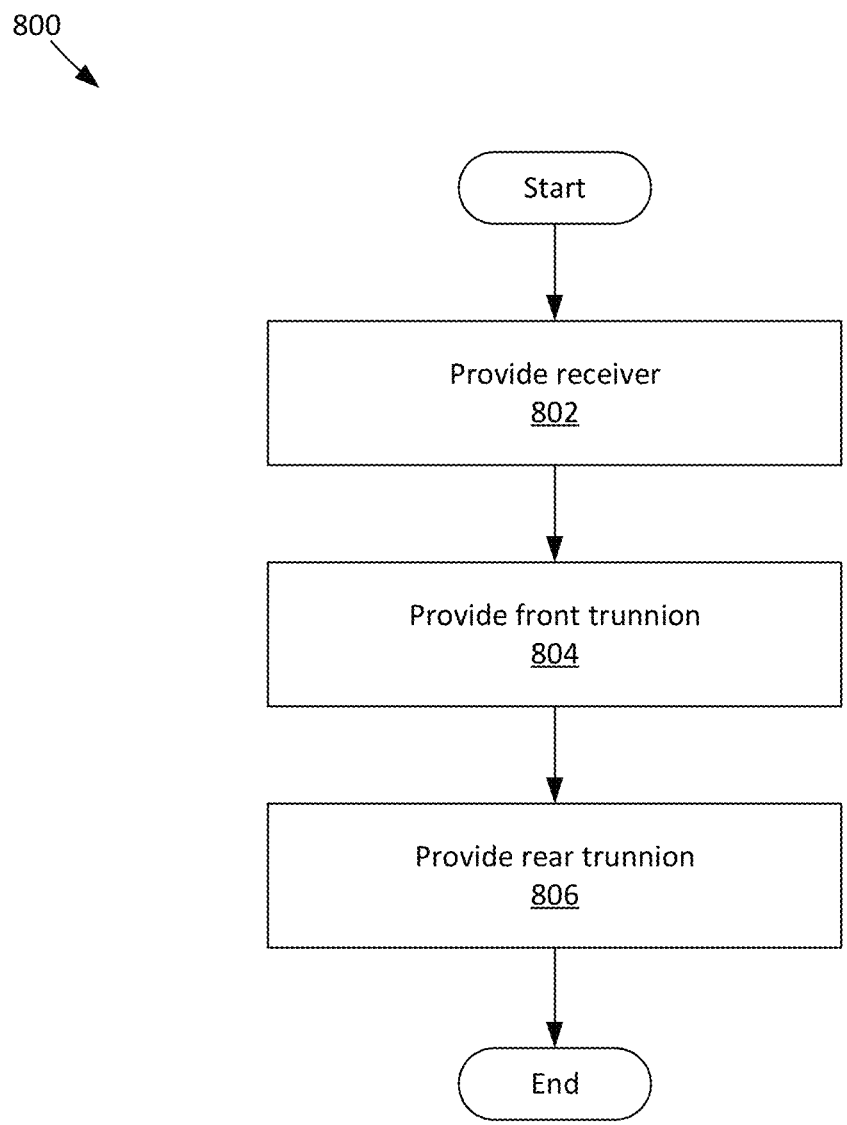
FIG. 8 is a schematic flowchart diagram illustrating one example of a method of providing a firearm, in accordance with examples of the subject disclosure.

FIG. 8 is a schematic flowchart diagram illustrating one example of a method of providing a firearm 100, in accordance with examples of the subject disclosure. The method 800 begins and, at block 802, a receiver 106 is provided. The receiver 106 is provided as described above with reference to FIGS. 1-7. At block 804, a front trunnion is provided, and at block 806 a rear trunnion is provided.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described examples are to be considered in all respects only as illustrative and not restrictive. All changes which come within the meaning and range of equivalency of the claims are to be embraced within their scope.

What is claimed is:

1. A receiver comprising:
   an elongated channel machined or 3D printed from a metallic material, where the elongated channel has a front end and a rear end, a first groove that extends along an internal surface of the elongated channel adjacent to a first top edge, and a second groove that extends along the internal surface of the elongated channel adjacent to a second top edge, and where the first groove and the second groove form a pair of grooves configured to receive a pair of rails;
   a front trunnion having a rear portion coupled to the front end of the elongated channel and having a front portion configured to couple to a handguard, and where the front trunnion is configured to engage the pair of rails; and
   a rear trunnion coupled to the rear end and configured to receive an accessory adapter.

2. The receiver of claim 1, where the pair of grooves extend along the top edges from an area adjacent the front end to an area adjacent to the rear end.

3. The receiver of claim 2, where the pair of rails are oriented substantially horizontally and configured to slideably engage with a bolt carrier assembly, and where each of the pair of rails is configured to insert into one of the pair of grooves.

4. The receiver of claim 3, where the receiver comprises a pair of notches formed adjacent to the rear trunnion and where each of the pair of notches is configured to receive an end of one of the pair of rails.

5. The receiver of claim 3, where each of the pair of rails comprises a substantially vertically oriented slot configured to slideably engage with an ambidextrous bolt catch, where the ambidextrous bolt catch spans a distance between the pair of rails.

6. The receiver of claim 5, where the receiver includes a pair of bolt catch slots positioned to correspond with the ambidextrous bolt catch and allow ends of the ambidextrous bolt catch to extend through the receiver to an area external to the receiver.

7. The receiver of claim 1, where the receiver comprises a bottom surface configured to receive a removable trigger guard.

8. The receiver of claim 7, where the receiver is further configured to couple with an ambidextrous magazine release.

9. The receiver of claim 1, further comprising a dust cover configured to couple to a top of the receiver.

10. The receiver of claim 9, further comprising an accessory rail that couples with the front trunnion and extends rearward over the dust cover and the receiver.

11. The receiver of claim 1, where the receiver is configured to couple to a pistol grip at a bottom of the receiver.

12. A firearm comprising:
    a barrel;
    a receiver comprising an elongated channel machined or 3D printed from a metallic material, where the elongated channel has a front end and a rear end, a first groove that extends along an internal surface of the elongated channel adjacent to a first top edge, and a second groove that extends along the internal surface of the elongated channel adjacent to a second top edge, and where the first groove and the second groove form a pair of grooves configured to receive a pair of rails;
    a front trunnion having a rear portion coupled to the front end of the elongated channel and having a front portion configured to couple to a handguard, and where the front trunnion is configured to engage the pair of rails; and
    a rear trunnion coupled to the rear end and configured to receive an accessory adapter.

13. The firearm of claim 12, where the pair of grooves extend along the top edges from an area adjacent the front end to an area adjacent to the rear end.

14. The firearm of claim 13, where the pair of rails are oriented substantially horizontally and configured to slideably engage with a bolt carrier assembly, and where each of the pair of rails is configured to insert into one of the pair of grooves.

15. The firearm of claim 14, where the receiver comprises a pair of notches formed adjacent to the rear trunnion and where each of the pair of notches is configured to receive an end of one of the pair of rails.

16. The firearm of claim 14, where each of the pair of rails comprises a substantially vertically oriented slot configured to slideably engage with an ambidextrous bolt catch, where the ambidextrous bolt catch spans a distance between the pair of rails.

17. The firearm of claim 16, where the receiver includes a pair of bolt catch slots positioned to correspond with the ambidextrous bolt catch and allow ends of the ambidextrous bolt catch to extend through the receiver to an area external to the receiver.

18. The firearm of claim 12, where the receiver comprises a bottom surface configured to receive a removable trigger guard.

19. The firearm of claim 18, where the receiver is further configured to couple with an ambidextrous magazine release.

20. A method comprising:
    providing an elongated channel machined or 3D printed from a metallic material, where the elongated channel has a front end and a rear end, a first groove that extends along an internal surface of the elongated channel adjacent to a first top edge, and a second groove that extends along the internal surface of the elongated channel adjacent to a second top edge, and where the first groove and the second groove form a pair of grooves configured to receive a pair of rails;
    providing a front trunnion having a rear portion coupled to the front end of the elongated channel and having a front portion configured to couple to a handguard, and where the front trunnion is configured to engage the pair of rails; and providing a rear trunnion coupled to the rear end and configured to receive an accessory adapter.

\* \* \* \* \*